(12) United States Patent
Taniguchi

(10) Patent No.: US 7,141,327 B2
(45) Date of Patent: Nov. 28, 2006

(54) SOLID ELECTROLYTE FUEL CELL AND MANUFACTURING METHOD THEREOF

(75) Inventor: Noboru Taniguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 414 days.

(21) Appl. No.: 10/453,535

(22) Filed: Jun. 4, 2003

(65) Prior Publication Data
US 2003/0228509 A1 Dec. 11, 2003

(30) Foreign Application Priority Data
Jun. 6, 2002 (JP) .............. P2002-165456

(51) Int. Cl.
*H01M 8/12* (2006.01)
*C04B 35/64* (2006.01)

(52) U.S. Cl. .......... 429/30; 429/33; 264/648
(58) Field of Classification Search .......... 429/30, 429/33, 34; 264/648
See application file for complete search history.

(56) References Cited

U.S. PATENT DOCUMENTS 3,266,940 A * 8/1966 Caesar ............ 429/33
4,024,036 A * 5/1977 Nakamura et al. ........ 429/33 X
4,758,481 A * 7/1988 Fauvel ................. 429/39
5,387,330 A * 2/1995 Taniguchi et al. ........ 429/33 X
6,306,536 B1 * 10/2001 Wilkinson et al. ......... 429/33
6,379,476 B1 * 4/2002 Tarutani et al. ........... 429/34 X
6,517,693 B1 * 2/2003 Taniguchi ............. 429/33 X
6,528,195 B1 * 3/2003 Taniguchi .............. 429/33

FOREIGN PATENT DOCUMENTS

JP 2000-302550 A 10/2000
JP 2001-307546 * 11/2001

* cited by examiner

*Primary Examiner*—Stephen J. Kalafut
(74) *Attorney, Agent, or Firm*—McDermott Will & Emery LLP

(57) ABSTRACT

A solid electrolyte fuel cell including a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1 \geq x \geq 0$, $0.3 > y > 0$, $0.04 > z \geq 0$, and $1.5 > \alpha > 0$); and an electrode that is mainly made of platinum and has catalysis properties; wherein an electrolyte has a film thickness of 300 μm or less, and a method of manufacturing the same are disclosed. The solid electrolyte fuel cell can obtain a cell output even at low temperatures equal to 500 degrees centigrade or less.

44 Claims, 9 Drawing Sheets

F I G. 1
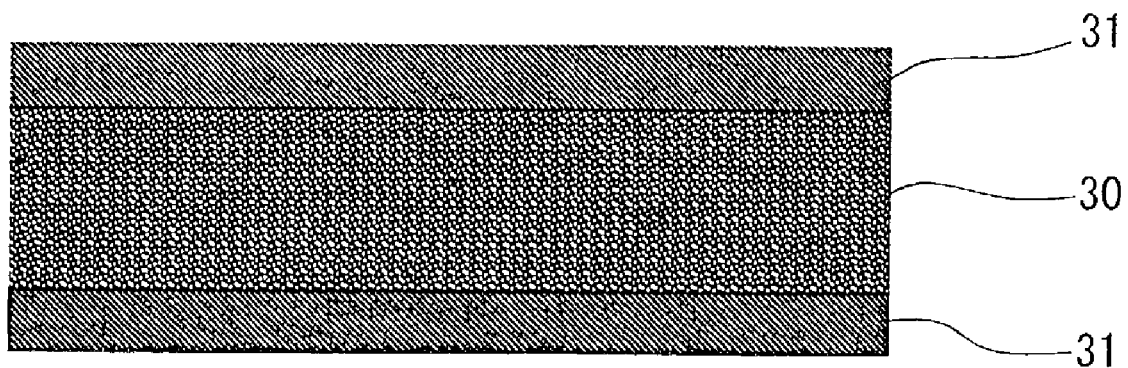

F I G. 5
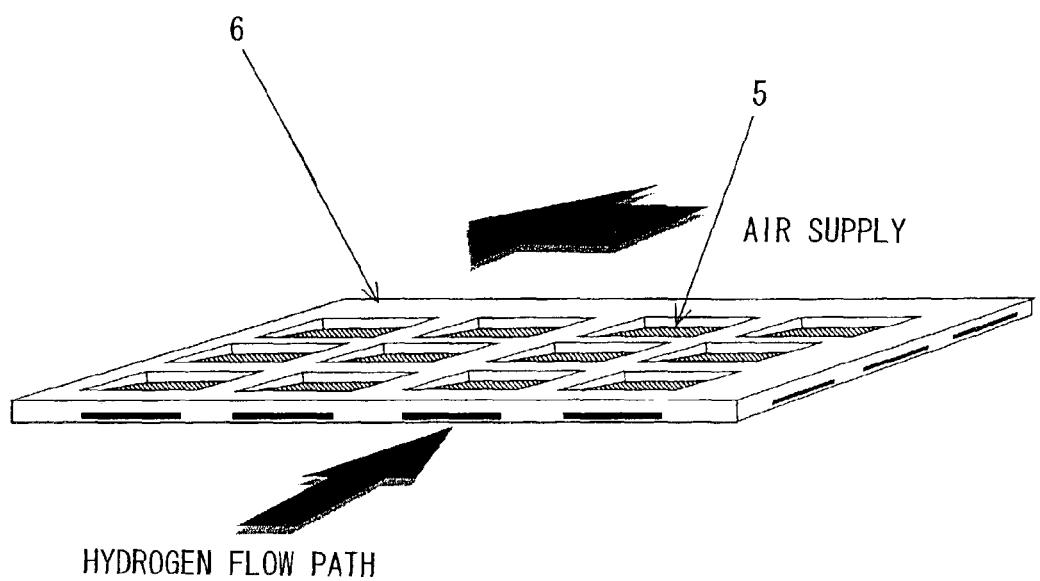

SOLID ELECTROLYTE FUEL CELL AND MANUFACTURING METHOD THEREOF

BACKGROUND OF THE INVENTION

1. Field of the Invention

The present invention relates to a solid electrolyte fuel cell and a manufacturing method thereof.

2. Description of the Related Art

Fuel cells, as power generators and devices that are clean and can save energy, have been advanced in developing stationary or mobile consumer power sources. Specifically, the fuel cells are attracting attention as household cogeneration power sources and power sources for use in electric cars.

In accordance with the difference of electrolytes, there are various kinds of fuel cells from ones that can be operated in temperatures anywhere from room temperature to ones that can be operated at substantially higher temperatures such as 1000 degrees centigrade; among these, the ones that are now in vigorous development are polymer type fuel cells that can be operated at 100 degrees centigrade or less and have an organic polymer as the electrolyte.

Almost all of the polymer electrolytes that are used in these types of fuel cells are perfluorocarbon sulfonic acid membranes (Trade name: NAFION) developed by E. I. du Pont de Nemours and Company; the membrane exhibits high proton conductivity (from $1\times10^{-2}$ to $1\times10^{-1}$ S/cm) in temperatures anywhere from room temperature to 100 degrees centigrade.

Furthermore, in recent years, very small fuel cells called micro-fuel cell are attracting attention as portable power sources in place of secondary batteries. Also, in the electrolyte membranes of this type, NAFION membranes are under study. A fuel cell is a device into which, usually, gaseous fuels such as hydrogen and air are supplied and electricity is extracted. As a fuel for use in mobile and portable fuel cells, an easy-carrying liquid fuel called direct methanol is considered.

At the present time, in the polymer fuel cell that uses the NAFION membrane, since the NAFION membrane has to be maintained in a water-saturated state, water management is necessary.

On the other hand, a solid electrolyte fuel cell, in which the electrolyte is a solid, is free from water; and since an entire fuel cell can be constituted without using a liquid, there are no problems of liquid leakage and liquid replenishment.

However, of the existing solid electrolyte fuel cells with an oxide ion conductor as the electrolyte, there is no report of a phenomenon of the proton conduction at 500 degrees centigrade or less. That is, in order to reduce filim resistance, the protonic oxide conductor has been produced more thinner. However, considering the problem of the mechanical strength of the film, approximately 450 µm is a lower limit; accordingly, in order to obtain sufficient cell output, heating to 500 degrees centigrade or more is considered to be necessary. As a result, there is a problem in that the solid electrolyte fuel cells cannot be used in such applications as cogeneration systems operating at less than 500 degrees centigrade and portable power sources operating in the neighborhood of room temperature.

Furthermore, in a high-temperature operating solid oxide fuel cell that can be operated in the neighborhood of 1000 degrees centigrade, when manufacturing a collective cell, there is a problem in that separators and housing materials, ceramics or heat-resistant alloys that are difficult to manufacture and costly have to be used.

Accordingly, the invention intends to provide a solid electrolyte fuel cell in which a cell output can be obtained even at temperatures lower than 500 degrees centigrade, materials that can be easily machined and are cheaper can be used as a separator and housing material, and a method of manufacturing the same.

SUMMARY OF THE INVENTION

In order to achieve the above intention, the invention is constituted as follows.

That is, a solid electrolyte fuel cell according to the invention includes a pair of electrodes and a solid electrolyte disposed between the electrodes. In the above, the solid electrolyte is a protonic oxide conductor having a composition represented by, for instance, $Ba(Zr_{1-x}Ce_x)_{1-y}M_y\text{-}Al_zO_{3-\alpha}$ (M: one or more kinds of elements selected from a group of tri-valent rare earth elements and In, $1>x>0$, $0.3>y>0$, $0.04>z>0$, and $1.5>\alpha>0$).

In the above, the M is one or more kinds of elements selected from a group of tri-valent rare earth elements and In; as the trivalent rare earth elements, La, Pr, Nd, Pm, Sm, Eu, Gd, Tb, Dy, Ho, Er, Tm, Yb, Lu, Sc and Y can be cited. When the M is made of two or more kinds of elements, a sum of compositional ratios thereof becomes y of the $M_y$.

According to the invention, when a protonic oxide conductor having the above composition is used, a water-free solid electrolyte fuel cell that is free from vaporization, dissipation or leakage of a solution can be rendered excellent in the mechanical strength and output a cell output even at low temperatures from room temperature to less than 500 degrees centigrade.

Furthermore, in the solid electrolyte fuel cell according to the invention, a supporting structure of the solid electrolyte is made of a resin material.

According to the invention, by use of a supporting structure made of a resin material, the mechanical strength of a solid electrolyte film can be reinforced.

Furthermore, in the solid electrolyte fuel cell according to the invention, at least any one of a separator, a current collector and a housing is formed of at least any one of a resin material, a carbon material and a metal.

According to the invention, the machinability is more excellent in comparison with existing ceramic materials or the like, resulting in realizing the cost reduction.

BRIEF DESCRIPTION OF THE DRAWINGS

These and other objects as well as advantages of the invention will become clear by the following description of preferred embodiments of the invention with reference to the accompanying drawings, wherein:

FIG. 1 is schematic sectional view of a solid electrolyte fuel cell according to an embodiment of the present invention;

FIG. 5 is a diagram showing an example of a fuel cell in which an electrolyte is reinforced with a resin in the embodiment;

In all these figures, like components are indicated by the same numerals.

DETAILED DESCRIPTION OF PREFERRED EMBODIMENTS

Figure 2:
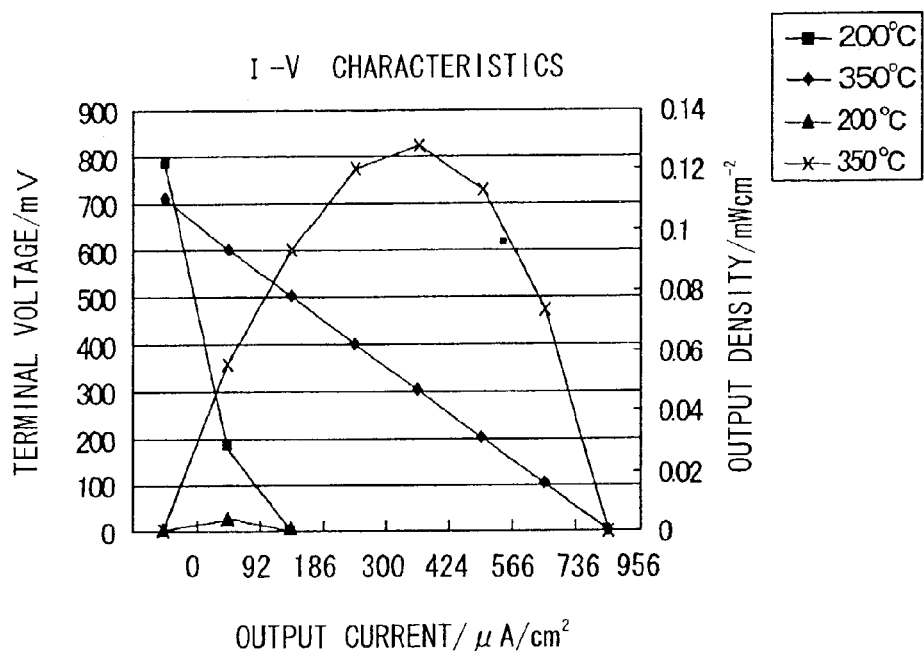
FIG. 2 is a diagram showing power generation characteristics in the present embodiment.

A solid electrolyte fuel cell according to the invention includes a pair of electrodes and a solid electrolyte disposed between the electrodes. In the above, the solid electrolyte is a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0$, $0.3>y>0$, $0.04>z>0$, and $1.5>\alpha>0$) and can obtain a cell output even at temperatures less than 500 degrees centigrade.

Furthermore, in the invention, the solid electrolyte is one of protonic oxide conductors having compositions represented by $BaCe_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$), $BaZr_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$), $Ba(Zr_{1-x}Ce_x)_{1-y}M_yO_{3-\alpha}$ (M: one or more kinds of elements selected from a group of tri-valent rare earth elements and In, $1>x>0$, $0.3>y>0$, and $1.5>\alpha>0$), $BaCe_{1-y}M_yO_{3-\alpha}$ (M: one or more kinds of elements selected from a group of tri-valent rare earth elements and In, $0.3>y>0$, and $1.5>\alpha>0$) or $BaZr_{1-y}M_yO_{3-\alpha}$ (M: one or more kinds of elements selected from a group of tri-valent rare earth elements and In, $0.3>y>0$ and $1.5>\alpha>0$), that can obtain a cell output even at temperatures less than 500 degrees centigrade.

In the invention, the M in the composition of the protonic oxide conductors is preferably constituted of one or more kinds of elements selected from In, Gd, Y and Yb.

Furthermore, in the invention, the protonic oxide conductor preferably has any one of compositions $BaCe_{0.8}Gd_{0.2}Al_{0.02}O_{3-\alpha}$, $BaZr_{0.6}Ce_{0.2}Gd_{0.2}O_{3-\alpha}$ or $BaZr_{0.4}Ce_{0.4}In_{0.2}O_{3-\alpha}$.

Furthermore, in the solid electrolyte fuel cell according to the invention, since the electrode is made of platinum supported on carbon, an excellent cell output can be obtained even at low temperatures less than 500 degrees centigrade.

Furthermore, in the solid electrolyte fuel cell according to the invention, since the electrode is made of a mixture of fine particulate platinum and a material having the same components as those of the protonic oxide conductor, an excellent cell output can be obtained even at temperatures less than 500 degrees centigrade.

Here, the fine particulate platinum has an average particle diameter of 1 μm or less, preferably 20 to 30 nm.

Furthermore, a solid electrolyte fuel cell according to the invention includes a pair of electrodes and a solid electrolyte disposed between the electrodes. In the above, the solid electrolyte is a proton conductor, one of the pairs of electrodes is mainly made of platinum, the other one is a porous electrode made of a porous material that supports platinum. In the above, excellent cell output can be obtained even at temperatures less than 500 degrees centigrade, and the porous electrode plays a role of reinforcing the mechanical strength of a solid electrolyte film.

The electrode mainly made of platinum includes a platinum electrode.

A solid electrolyte fuel cell according to the invention includes a pair of electrodes and a solid electrolyte disposed between electrodes. In the above, the electrodes are mainly made of platinum and the solid electrolyte is a protonic oxide conductor. In the above, a film body and a structure that supports the film body are formed in one integrated body, and thereby the mechanical strength of the film body of the solid electrolyte can be reinforced by the integrated supporting structure.

Furthermore, a solid electrolyte fuel cell according to the invention includes a pair of electrodes and a solid electrolyte disposed between electrodes. In the above, the solid electrolyte is a protonic oxide conductor, an integrated structure of a dense sintered body and a porous sintered body and can obtain excellent cell output even at temperatures less than 500 degrees centigrade, and the porous sintered body can play a role of reinforcing the mechanical strength.

Here, the dense sintered body is one that does not allow a gas to permeate it, and the porous body is one that allows a gas to permeate it.

Furthermore, in a solid electrolyte fuel cell according to the invention, at least any one of a separator, a current collector and a housing is formed of at least any one of a resin material, a carbon material and metal. Since the materials excellent in the machinability in comparison with the existing ceramics are used, the cost reduction can be attained.

The separator may be structured so as to combine with the current collector.

A method of manufacturing a solid electrolyte fuel cell according to the invention includes superposing at least two or more sheets of an electrolyte slurry and co-sintering, and thereby forming an integrated structure of an solid electrolyte and a supporting structure. In the above, the co-sintering allows the supporting structure that enhances the mechanical strength of a solid electrolyte film to be easily integrated.

Furthermore, a method of manufacturing a solid electrolyte fuel cell, according to the invention, includes preparing sheets of an electrolyte slurry, in which an amount of an organic binder is differentiated between a dense one and a porous one; and superposing at least two or more sheets and co-sintering these to provide the solid electrolyte with an integrated structure of the dense sintered body and porous sintered body. The co-sintering allows obtaining a solid electrolyte in which the porous sintered body for reinforcing the mechanical strength is integrated with the dense sintered body.

In the following, embodiments of the invention will be detailed with reference to drawings.

EXAMPLES

Example 1

As shown in FIG. 1, a solid electrolyte fuel cell according to the present example includes a solid electrolyte 30 made of a protonic oxide conductor, and a pair of electrodes 31 and 31.

In the configuration of FIG. 1, the solid electrolyte fuel cell of this example is formed of: a solid electrolyte made of a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1 \geq x \geq 0$, $0.3 > y > 0$, $0.04 > z \geq 0$, and $1.5 > \alpha > 0$); and electrodes mainly made of platinum and having a catalyst function. In the above, the solid electrolyte has a thickness of 300 μm or less and allows the fuel cell to operate, without humidifying, at temperatures from room temperature to less than 350 degrees centigrade.

In the example, first, a cylindrical sintered body (diameter: 13 mm, a thickness: 10 mm) of a protonic oxide conductor that is a solid electrolyte was compounded according to a high-temperature solid phase method, then this was cut and polished to a thin plate having a thickness of 300 μm or less. On both surfaces of the disc, platinum paste (available from Tanaka Kikinzoku Kogyo K. K.) was coated and printed, and thereby a cell for a fuel cell was prepared.

To the respective electrodes of the prepared cell for a fuel cell, no-humidified hydrogen gas and air were supplied to study a power-generating property of the fuel cell. Furthermore, the cell for the fuel cell was structured so that it could be maintained at a constant temperature by being externally heated with a heater.

In FIG. 2, an example of power generating properties (I–V characteristics) at various temperatures of a battery cell in which 220 μm thick $BaZr_{0.4}Ce_{0.4}In_{0.2}O_{3-\alpha}$ is used as a solid electrolyte is shown.

That is, FIG. 2 shows relationship between terminal voltage (mV), output current (μA/cm$^2$) and output density (mW/cm$^2$) at 200 and 350 degrees centigrade.

As is clean from the drawing, it was confirmed that even at 200 degrees centigrade, without humidifying, the power generation was possible.

Furthermore, in Table 1 below, relationship between film thicknesses of electrolyte of a plurality of cells of fuel cells in which protonic oxide conductors (electrolyte material) having compositions of the invention are used as a solid electrolyte and maximum output densities that show power generating properties at a plurality of temperatures is shown.

TABLE 1

| Electrolyte Material | Film Thickness Thickness (μm) | Maximum Output Density (mW/cm$^2$) | | | |
|---|---|---|---|---|---|
| | | 350° C. | 200° C. | 100° C. | 30° C. |
| $BaZr_{0.4}Ce_{0.4}In_{0.2}O_{3-\alpha}$ | 220 | 0.12 | 0.004 | — | — |
| $BaZr_{0.6}Ce_{0.2}Gd_{0.2}O_{3-\alpha}$ | 300 | 0.1 | 0.003 | — | — |
| $BaZr_{0.4}Ce_{0.4}Y_{0.2}O_{3-\alpha}$ | 300 | 0.2 | 0.006 | — | — |
| $BaZr_{0.4}Ce_{0.4}Yb_{0.2}O_{3-\alpha}$ | 250 | 0.4 | 0.01 | 0.001 | — |

TABLE 1-continued

| Electrolyte Material | Film Thickness Thickness (μm) | Maximum Output Density (mW/cm$^2$) | | | |
|---|---|---|---|---|---|
| | | 350° C. | 200° C. | 100° C. | 30° C. |
| $BaCe_{0.8}Gd_{0.2}O_{3-\alpha}$ | 300 | 0.9 | 0.03 | 0.002 | 0.0005 |
| $BaCe_{0.8}Gd_{0.2}Al_{0.02}O_{3-\alpha}$ | 150 | 1.2 | 0.04 | 0.003 | 0.001 |
| $BaZr_{0.4}Ce_{0.4}In_{0.2}Al_{0.02}O_{3-\alpha}$ | 100 | 0.25 | 0.01 | 0.001 | 0.0001 |
| $BaZr_{0.5}Ce_{0.2}Gd_{0.2}Al_{0.02}O_{3-\alpha}$ | 150 | 0.2 | 0.006 | 0.0002 | — |
| $BaZr_{0.52}Ce_{0.24}Gd_{0.24}O_{3-\alpha}$ | 150 | 1.0 | 0.03 | 0.001 | 0.0002 |
| $BaZr_{0.56}Ce_{0.24}Gd_{0.2}O_{3-\alpha}$ | 100 | 1.5 | 0.06 | 0.004 | 0.002 |
| $BaZr_{0.3}Ce_{0.5}In_{0.2}O_{3-\alpha}$ | 100 | 1.4 | 0.05 | 0.003 | 0.002 |

As is clean from Table 1, it was confirmed that even in the neighborhood of room temperature, there were electrolyte materials that could generate power without humidifying. It is considered more than ever that a protonic oxide conductor was confirmed to generate power even at such a low temperature.

According to the invention, due to the electrolyte materials that are confirmed to be proton conductive in the neighborhood of room temperature and the thin film technology, a solid electrolyte fuel cell capable of generating power in the neighborhood of room temperature can be provided. It is clean from FIG. 1 and Table 1 that even at temperatures higher than room temperature, for instance, 300 and 500 degrees centigrade, power can be generated.

Example 2

In a protonic oxide conductor, as a thickness of the electrolyte is made thinner, cell internal resistance can be made lower, resulting in an improvement in output characteristics of a battery.

However, the thinning of a film by machining and polishing largely depends on the mechanical strength of the material. In the existing proton conductor materials, a lower limit in thickness is 450 to 500 μm. In general, whether or not there is a material that can be singly made 300 μm or less is one measure from a practical point of view. That is, in the invention, the solid electrolyte preferably has a film structure of 300 μm or less.

In this connection, the mechanical strength of the solid electrolyte materials that are a plurality of proton conductor materials shown in Table 1 in Example 1 was evaluated as follows.

Figure 3:
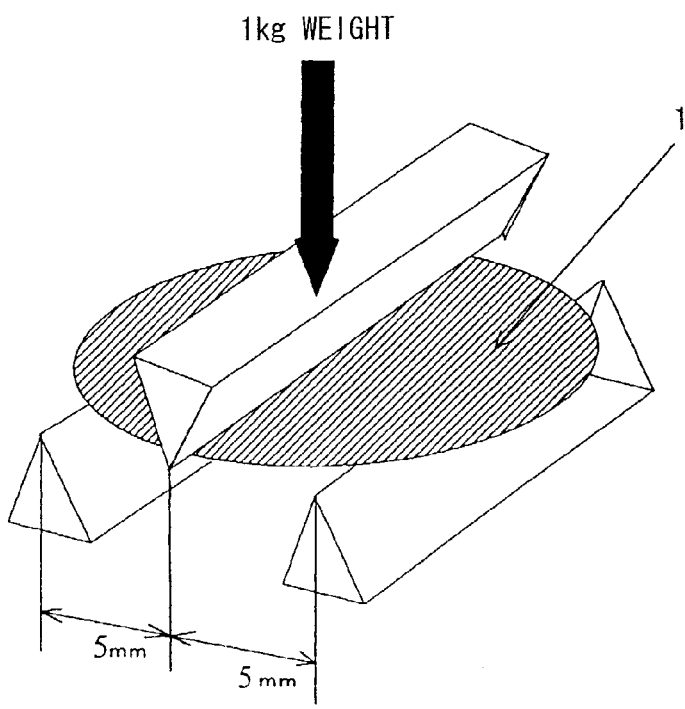
FIG. 3 is a diagram showing a bending strength test in the embodiment.

That is, from an electrolyte material obtained according to the sintering method used in Example 1, by mechanically polishing to make it thinner, as shown in FIG. 3, a disc-like sample 1 having a diameter of 13 mm was prepared. The disc-like sample 1 was supported at both sides thereof 10 mm apart, and on a diameter portion at center thereof, a weight of 1 kg was applied to evaluate the bending strength.

In Table 2 below, limit thicknesses that could withstand the 1 kg weight are shown.

TABLE 2

| Electrolyte Material | Limit Thickness that can withstand 1 kg Weight (μm) |
|---|---|
| $BaZr_{0.4}Ce_{0.4}In_{0.2}O_{3-\alpha}$ | 250 |
| $BaZr_{0.6}Ce_{0.2}Gd_{0.2}O_{3-\alpha}$ | 300 |
| $BaZr_{0.4}Ce_{0.4}Y_{0.2}O_{3-\alpha}$ | 300 |
| $BaZr_{0.4}Ce_{0.4}Yb_{0.2}O_{3-\alpha}$ | 250 |
| $BaCe_{0.8}Gd_{0.2}O_{3-\alpha}$ | 350 |
| $BaCe_{0.8}Gd_{0.2}Al_{0.02}O_{3-\alpha}$ | 250 |
| $BaZr_{0.4}Ce_{0.4}In_{0.2}Al_{0.02}O_{3-\alpha}$ | 200 |
| $BaZr_{0.6}Ce_{0.2}Gd_{0.2}Al_{0.02}O_{3-\alpha}$ | 250 |
| $BaZr_{0.52}Ce_{0.24}Gd_{0.24}O_{3-\alpha}$ | 250 |
| $BaZr_{0.56}Ce_{0.24}Gd_{0.2}O_{3-\alpha}$ | 200 |
| $BaZr_{0.3}Ce_{0.5}In_{0.2}O_{3-\alpha}$ | 250 |

As shown in Table 2, while some solid electrolytes could maintain by itself the strength to a film thickness of 100 μm, with respect to almost all of the solid electrolytes it was confirmed that these could be made thin to a film thickness of approximately 300 μm by the mechanical polishing.

In the example, the ones that were not insufficient in the mechanical strength were reinforced in the mechanical strength with resin.

Figure 4:
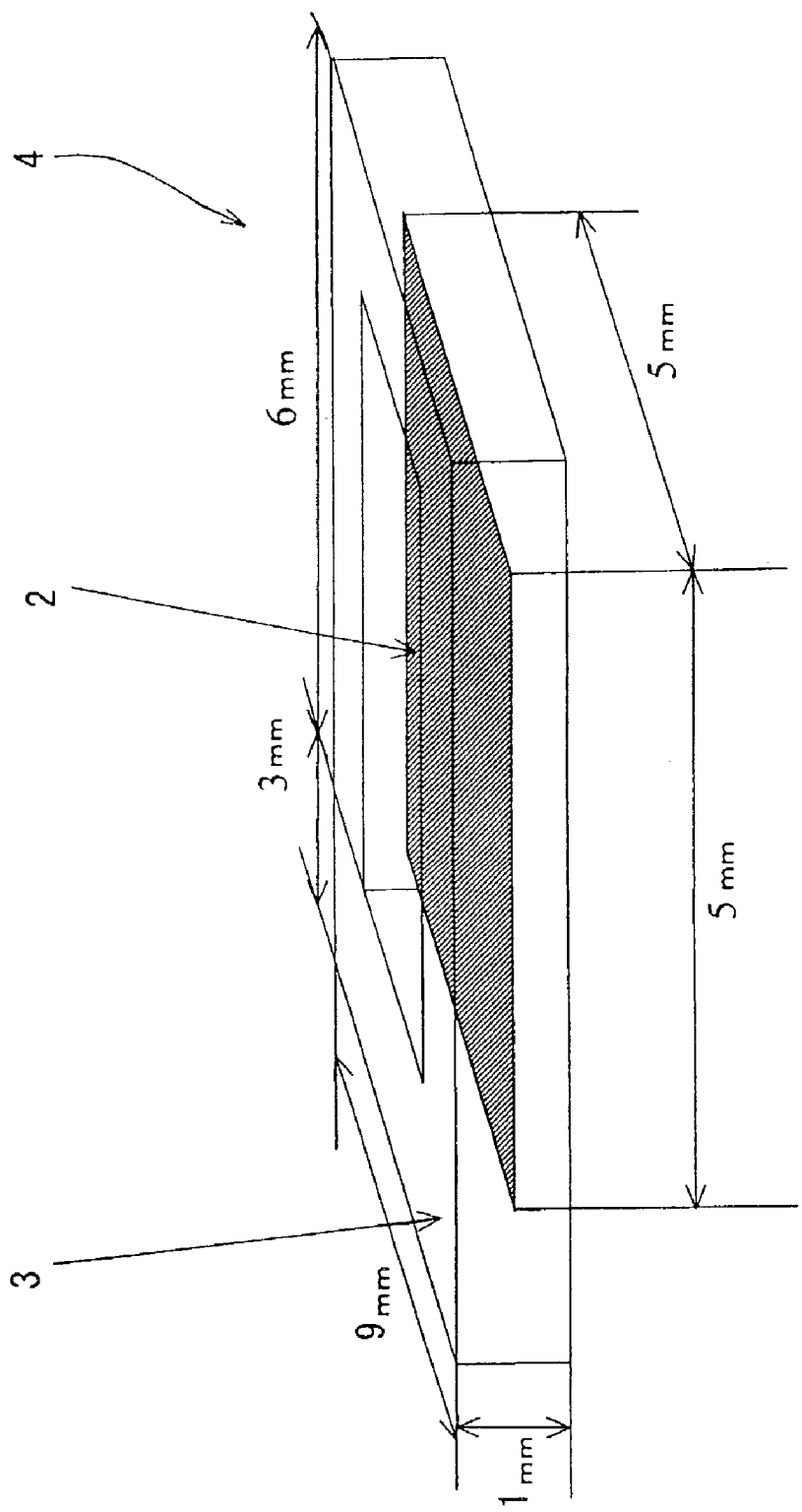
FIG. 4 is a diagram showing an example of electrolyte reinforcement with a resin in the embodiment.

In the example, similarly to the above, a sintered electrolyte was cut and made thin by polishing. As shown in FIG. 4, in the surroundings of a thinned film of a solid electrolyte 2, the reinforcement was applied with an epoxy resin frame 3 as a supporting structure.

The epoxy resin frame 3 was formed in such a shape that it had a thickness of 1 mm and an opening of 3 mm×3 mm in a center portion of a rectangle of 9 mm×9 mm. In the center portion of the epoxy resin frame 3, a 5 mm×5 mm rectangular solid electrolyte film 2 was held at a periphery portion thereof, and a top and bottom surface of the solid electrolyte film 2 were structured so as to face from the opening of the epoxy resin frame 3. Furthermore, in this example, the solid electrolyte film 2 was held at a substantially central position in a thickness direction of the epoxy resin frame 3.

A sample 4 that has such epoxy resin frame 3 was subjected to a test similar to the above. That is, support tables were disposed 5 mm apart left and right with a diagonal line of the rectangular epoxy resin frame 3 at a center, and, along the diagonal line of the rectangle, a weight of 1 kg was applied on the epoxy resin frame 3.

When the strength was evaluated according to the bending strength test, it was confirmed that all of the materials shown in Table 2 could withstand the weight of 1 kg weight. Furthermore, it was found that, in all of the samples, in a dimension of 5 mm×5 mm, a thickness could be thinned to 50 μm, and, as shown in FIG. 5, a plurality of cells 5 of a solid electrolyte fuel cell could be simultaneously reinforced with an epoxy resin frame 6.

In the epoxy resin frame 6, a top surface of a cell 5 of a solid electrolyte fuel cell faces an air feed path through a rectangular opening, and a bottom surface of the cell 5 of the solid electrolyte fuel cell faces a hydrogen path formed in the epoxy resin frame 6.

In FIG. 5, arrow marks show directions of the hydrogen path and air path, respectively.

As is clean from the example, it was confirmed that when the strength was reinforced with a resin, even materials that were difficult to form a thin plate could be used as an electrolyte of the battery.

In the example, the resin was epoxy-based resin; however, other resins, for instance, polypropylene-based, polyethylene-based, polyamide-based, polyimide-based, silicone-based, and Teflon-based resin can also be used.

Example 3

In the present example, in the electrode material, a material mainly made of platinum, platinum supported on carbon, or a mixture of fine particles of platinum and a solid electrolyte of a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1 \geq x \geq 0$, $0.3 > y > 0$, $0.04 > z \geq 0$, and $1.5 > \alpha > 0$) is used.

To a sintered electrolyte similar to that in Example 1, various kinds of electrode were adhered and fuel cell power generating characteristics were studied. In the example, 220 μm thick $BaZr_{0.4}Ce_{0.4}In_{0.2}O_{3-\alpha}$ a electrolyte was used as the electrolyte material. Electrode materials other than the platinum paste used in Example 1, such as a paste of fine particle platinum, various kinds of pastes of gold, silver, copper and nickel, a paste of platinum supported on carbon, and a paste of a 1:1 mixture by weight of fine particulate platinum and $BaZr_{0.4}Ce_{0.4}In_{0.2}O_{3-\alpha}$ were subjected to the test. In the example, in the paste, 2-weight percent polyvinyl alcohol was diluted with toluene, and the viscosity was adjusted by dropping terpineol. Furthermore, the various kinds of metal pastes were adhered by heating at 850 degrees centigrade for 3 hr, and the paste of platinum supported on carbon was adhered while pressed at 200 degrees centigrade.

Figure 6:
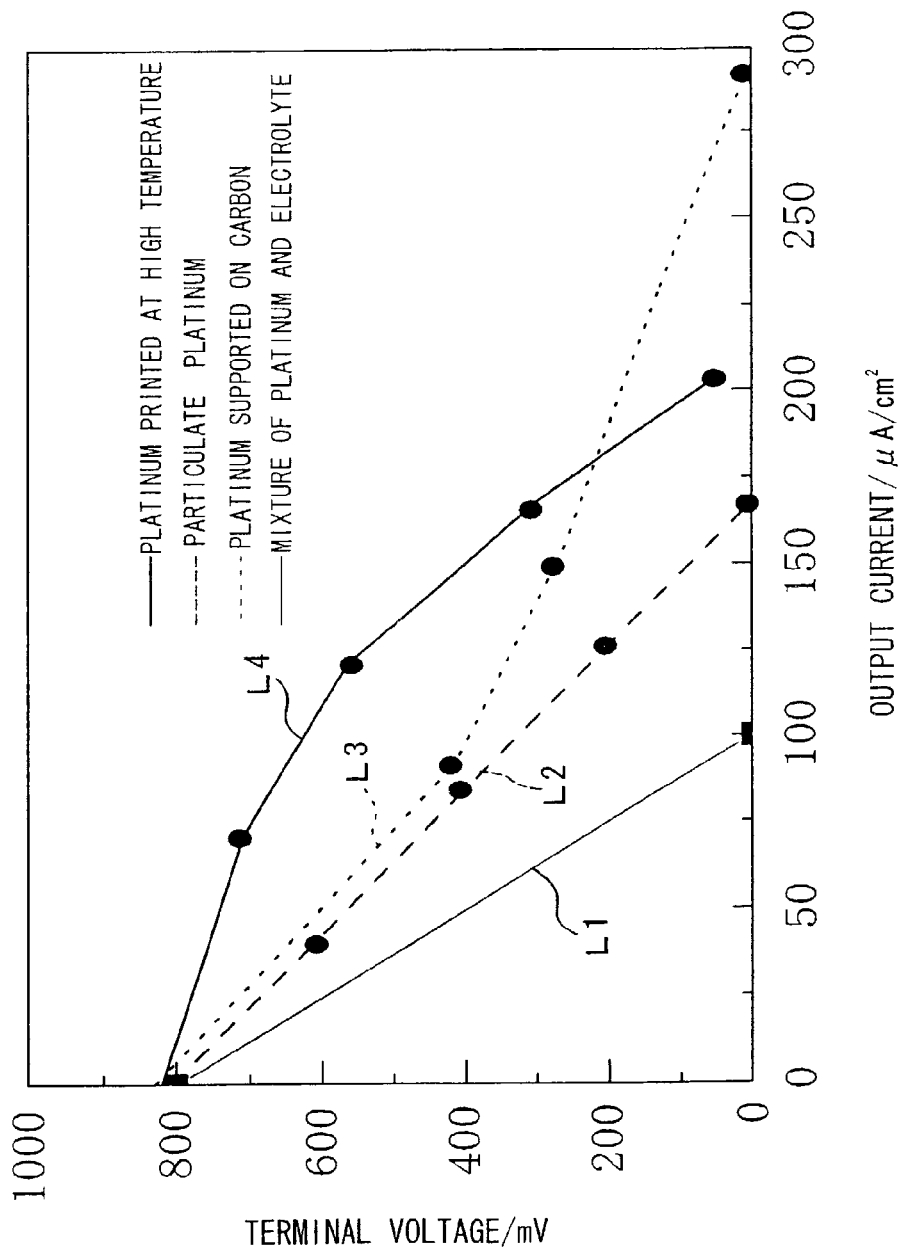
FIG. 6 is a diagram showing power generation characteristics in the embodiment.

In FIG. 6, output characteristics (I–V characteristics) of fuel cells at 200 degrees centigrade when various kinds of electrodes were used are shown. In FIG. 6, line L1, line L2, line L3 and line L4, respectively, show output characteristics of the high-temperature printed platinum electrode, particulate platinum electrode, platinum supported on carbon electrode, and mixture electrode of the particulate platinum and the electrolyte.

Sufficient characteristics could not be obtained by the use of the pastes of gold, silver, copper and nickel. On the otherhand, in the platinum-based materials, output was observed. Particularly, high output was observed in the one that used the particulate platinum and the one that used the platinum supported on carbon. Furthermore, it was found that high output was also obtained in the mixture of the particulate platinum and the electrolyte material.

As is clean from the example, it was confirmed that when the mixture of the protonic oxide conductor (electrolyte material) and the particulate platinum, or the platinum supported on carbon was used, higher cell output could be taken out. Furthermore, the electrode of the mixture of the platinum particulate and the electrolyte, in addition to obtaining high cell characteristics, has a large effect in reinforcing the strength of the thin plate of the electrolyte. When the bending strength was actually measured according to the method shown in Example 2, it was found that the mixture electrode was up to two-times stronger.

In the example, an example of a 1:1 mixing ratio of the particulate platinum and the electrolyte material was shown; however, the mixing ratio may be 1:2 or 2:1; furthermore, the electrolyte material may not be utterly the same one as the electrolyte. Furthermore, in the example, the particulate platinum in the range of from 20 to 30 nm was used; however, fine particles other than the above may be used.

Example 4

The present example relates to a fuel cell that includes a solid electrolyte made of a protonic oxide conductor, an electrode mainly made of platinum and having catalyst performance, and a porous electrode formed of a porous material that carries platinum; wherein a film of the solid electrolyte is formed on the porous electrode, and a method of manufacturing the same.

As an electrolyte of a fuel cell, as mentioned above, since the thinner the film (when a distance between electrodes is made smaller), the lower the electric resistance of the film, an amount of electricity (current output) that can be extracted can be improved. Accordingly, the electrolyte is necessary to be made thinner and denser. However, when the electrolyte is made thinner, the mechanical strength becomes smaller, resulting in difficulty in configuring a battery.

In the example, a porous electrode supports the mechanical strength.

In the example, in the electrolyte material, $BaCe_{0.8}Gd_{0.2}Al_{0.02}O_{3-\alpha}$ was used. Predetermined amounts of barium acetate, cerium oxide, gadolinium oxide, and aluminum hydroxide were weighed and pulverized and mixed in an alcohol solvent by use of a mortar followed by a ball mill until an average particle diameter of 1 μm or less was obtained.

The powder mixture was subjected to degreasing followed by sufficient drying. The powder was transferred into a ceramic crucible and sintered at 1050 degrees centigrade for 12 hrs, then taken out, and pulverized in benzene that was a nonaqueous solvent by use of a planetary ball mill. By the pulverization with the planetary ball mill, particles were pulverized to 1 μm or less in particle size. The pulverized powder was thoroughly dewatered by use a vacuum dryer, mixed at a ratio of 1:1 by volume with platinum powder having a particle diameter of 1 μm or less in toluene, further mixed with 10 weight percent of polyvinyl alcohol, furthermore mixed with 5 weight percent of dibutyl phthalate as a plasticizer, and thereby a slurry was prepared. Toluene as a solvent was added in half an amount of the powder by weight ratio.

The slurry was coated, according to a Doctor Blade method, at a thickness of 1 mm on a polyethylene terephthalate sheet, followed by, after degassing and drying, sintering in an electric furnace at 1100 degrees centigrade for 8 hr.

An obtained sheet was a porous platinum cermet (porous electrode) having porosity of approximately 20 percent and a thickness of 0.7 mm. Furthermore, the bending strength of the sheet, according to the measurement method of Example 2, was enough to withstand a weight of 1 kg.

Figure 7:
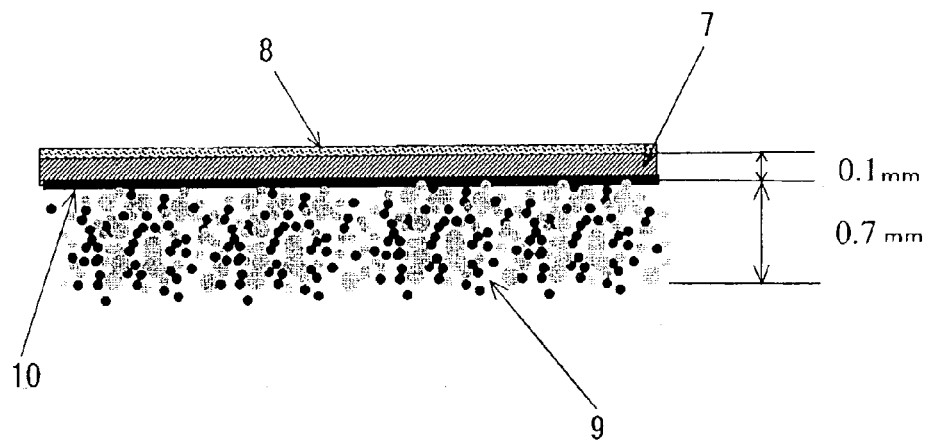
FIG. 7 is a sectional view of a battery cell in the embodiment.

Next, a cell of a fuel cell shown in a sectional view of FIG. 7 was prepared. To a 100 μm dense $BaCe_{0.8}Gd_{0.2}Al_{0.02}O_{3-\alpha}$ electrolyte film 7 prepared in advance according to the sintering method, a platinum electrode 8 was printed and baked. Subsequently, on one surface of thus obtained porous electrode 9, a carbon black electrode 10 was coated followed by thermo-compression bonding with the electrolyte film 7, and thereby a cell of a fuel cell was prepared. As shown in FIG. 6, it is understood that the porous electrode 9 functions as a structural material that reinforces the electrolyte film 7.

To the cell, similarly to Example 1, hydrogen and air were fed to study power-generating properties of the cell. The output was stably extracted, and a maximum output of 0.004 $mW/cm^2$ at room temperature was obtained. It was confirmed to operate as a fuel cell at room temperature.

In the example, a method was shown in which the porous electrode was prepared by sintering after the sheet formation; however, there is no need of forming in the sheet, a bulk body can be used, or in the preparation of the slurry, other materials can be used for the binder and the solvent, and the mixing amounts are not stipulated. The slurry may be prepared according to whatever methods, and, the electrolyte film, though prepared from a sintered body in the example, may be prepared from sheet or obtained by use of a gaseous phase method such as vapor deposition and sputtering.

Example 5

The present example relates to a solid electrolyte fuel cell in which an electrolyte of a protonic oxide conductor is an integrated body of a dense sintered body and a porous sintered body, and a method of manufacturing the same. The manufacturing method is one in which sheets of an electrolyte slurry are sintered; in that case, green sheets in which amounts of organic binders are varied are prepared, and at least two kinds or more of sheets are superposed and co-sintered.

In the example, $BaZr_{0.6}Ce_{0.2}Gd_{0.2}Al_{0.02}O_{3-\alpha}$ was used for the electrolyte material. Predetermined amounts of barium acetate, zirconium hydroxide, cerium oxide, gadolinium oxide, and aluminum hydroxide were weighed and pulverized and mixed in an alcohol solvent by use of a mortar followed by a ball mill until an average particle diameter of 1 μm or less was obtained.

The powder mixture was subjected to degreasing followed by sufficient drying. The powder was transferred into a ceramic crucible and sintered at 1300 degrees centigrade for 12 hrs, then taken out and pulverized in benzene that is a nonaqueous solvent by use of a planetary ball mill. By the pulverization with the planetary ball mill, particles were pulverized to 1 μm or less in particle size. The pulverized powder was thoroughly dewatered by use a vacuum dryer, and thereby a dry electrolyte powder was obtained. To the powder, as a solvent, a solvent mixture of butyl acetate and butyl cellosolve (4:1 by weight ratio) was added in an amount of a half a weight of the powder, followed by mixing and then pulverizing by use of a ball mill. The powder was pulverized with 5ϕ zirconia balls and a polyethylene vessel for 24 hrs, after the pulverization, passed through a #32 mesh filter to separate balls as media and the slurry.

Here, two kinds of slurries were prepared. One was used for a dense film and the other one was used for a porous film.

First, a slurry for use in the dense film was prepared. After a weight of the slurry was measured again, thereto was mixed 6 weight percent of polyvinyl butyral (PVB) as a binder, further more added 2 weight percent of butylbenzil phthalate (BBP) as a plasticizer, and thereby a slurry was prepared. An amount of a solvent was set at a half a weight of the powder. The slurry was again mixed by use of a ball mill, after the vacuum degassing, coated in sheet on a polyethylene terephthalate sheet according to the Doctor Blade method. A gap of the Doctor Blade was set at 500 μm in the example and the sheet was run at a speed of substantially 20 mm/sec. After the coating, the sheet was dried. A thickness of the obtained sheet was in the range of 130 to 140 μm.

In the next place, a slurry for use in the porous film was prepared. Similarly to the above, by varying amounts of the binder and the plasticizer of the slurry, sheets were prepared. In the example, an amount of PVB as a binder and that of a plasticizer were set at 12 weight percent and 4 weight percent, respectively. Similarly to the above, sheets were prepared by use of the Doctor Blade, and thicknesses of the obtained sheets were in the range of approximately 100 to 120 μm.

A fuel cell that has an integrated structure of a dense sintered body and a porous sintered body was manufactured as follows. First, one green sheet for use in the dense body and four sheets for use in the porous film were cut into two cm square and pressurized at 80 degrees centigrade under a pressure of $4 \times 10^7$ Pa to laminate. After the lamination, the laminated body was further cut into a 15 mm square, thrown into an electric furnace, and sandwiched from up and down with alumina plane tables. A weight of a top aluminum plate was approximately 100 g. In this state, the electric furnace was heated to 1600 degrees centigrade, and the laminated body was sintered at this temperature for 10 hrs in air. The obtained sheet was an integrated sintered body of the dense film and the porous films having a total thickness of approximately 0.35 mm, and exhibited the bending strength that could withstand a weight of 1 kg according to the measurement method of Example 2. Furthermore, when the air-tightness test was carried out, it was found to have the permeability of $1 \times 10^{-3}$ mL●mm/atm●min●cm² or less, that is, sufficient air-tightness.

Figure 8:
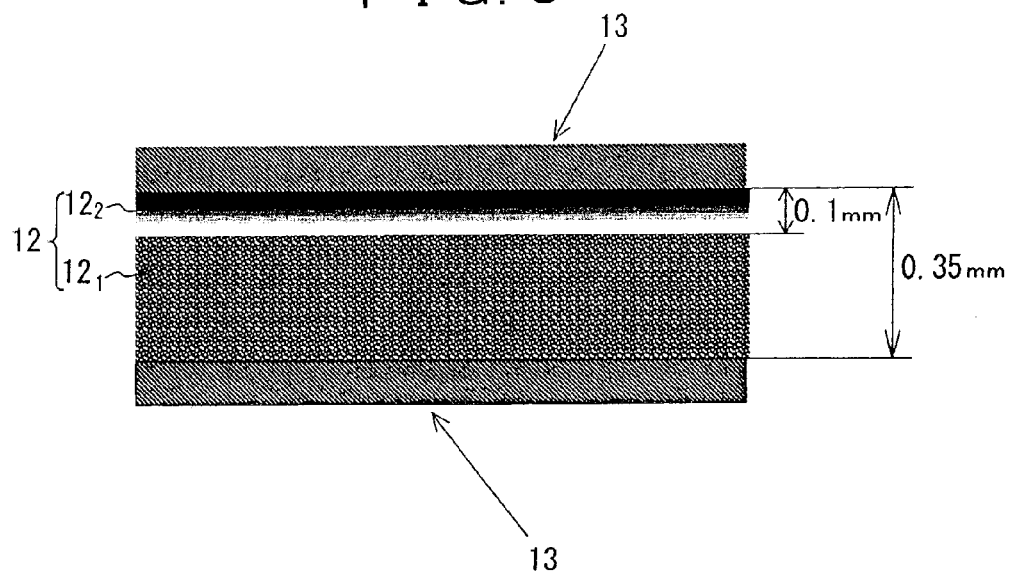
FIG. 8 is a sectional view of a battery cell in the embodiment.

With the integrated electrolyte, a cell for a fuel cell of which sectional view is shown in FIG. 8 was prepared. On both surfaces of the integrated electrolyte 12, a platinum carbon paste 13 was coated, subjected to hot pressing at 200 degrees centigrade, and thereby a battery was prepared. Thus, it is found that the integrated electrolyte 12 of the porous body $12_1$ and dense body $12_2$ could function as a structural material.

To the cell, similarly to Example 1, hydrogen and air were fed and the power-generating properties of: the cell were investigated. The output was stably extracted, and at room temperature and 300 degrees centigrade, maximum outputs of 0.006 mW/cm² and 1 mW/cm², respectively, were obtained. It was confirmed that it could excellently be operated as a fuel cell from room temperature to 300 degrees centigrade.

The preparation of the slurry is not restricted to the example; that is, the binder and the solvent may be other substances, and neither the mixing amount nor the Doctor Blade gap is stipulated. Furthermore, when an integrated electrolyte of the dense and porous films is prepared, in the present example, one dense film and four porous films were used; however, for instance, three porous films may be laminated on the respective surfaces of one dense film, the number to be laminated and the method to laminate may conform to cell design. The sintering temperature and the sintering method may have any patterns. The preparation of the electrode is not provided either.

Example 6

The present example relates to a fuel cell that includes a solid electrolyte of a protonic oxide conductor, and electrodes that are mainly made of platinum and have catalyst performance, wherein the solid electrolyte is a flat film body, and the flat film body and a supporting structure are integrated in one body, and a method of manufacturing the same. According to the method of preparing the integrated structure of the flat film body of the electrolyte of a protonic oxide conductor and the supporting structure, a method of sintering from sheets of an electrolyte slurry is adopted in which at least two or more sheets are stacked and co-sintered, and thereby the integrated structure is prepared.

In the example, as an electrolyte material, $BaZr_{0.4}Ce_{0.4}In_{0.2}Al_{0.02}O_{3-\alpha}$ was used. Similarly to Example 5, predetermined amounts of barium acetate, zirconium hydroxide, cerium oxide, indium oxide, and aluminum hydroxide were weighed and pulverized and mixed in an alcohol solvent by use of a mortar followed by a ball mill until an average particle diameter of 1 μm or less was obtained. The powder mixture was subjected to degreasing followed by sufficient drying. The powder was transferred into a ceramic crucible and sintered at 1300 degrees centigrade for 12 hrs, then taken out and pulverized in benzene that is a nonaqueous solvent by use of a planetary ball mill. By the pulverization with the planetary ball mill, particles were pulverized to 1 μm or less in particle size. The pulverized powder was thoroughly dewatered by use a vacuum dryer, and thereby a dry electrolyte powder was obtained. To the powder was added a solvent mixture of butyl acetate and butyl cellosolve (4:1 by weight ratio) as a solvent in an amount of a half a weight of the powder, followed first by mixing and then pulverizing by use of a ball mill. The powder was pulverized with 5φ zirconia balls and a polyethylene vessel for 24 hrs, then passed through a #32 mesh filter to separate balls as media and the slurry.

Next, a slurry is prepared. After a weight of the slurry was measured again, thereto was mixed 6 weight percent of polyvinyl butyral (PVB) as a binder, furthermore was added 2 weight percent of butylbenzil phthalate (BBP) as a plasticizer, and thereby a slurry was prepared. An amount of a solvent was set at a half a weight of the powder. The slurry was again mixed by use of a ball mill, after the vacuum degassing, coated in sheet on a polyethylene terephthalate sheet according to the Doctor Blade method. A gap of the Doctor Blade was set at 500 μm in the example and the sheet was run at a speed of approximately 20 mm/sec., After the coating, the sheet was dried. A thickness of the obtained sheet was in the range of 130 to 140 μm.

A fuel cell in which a flat film body and a supporting structure were integrated in one body was prepared as follows. A green sheet was first cut as it is into 2 cm square, then four green sheets were cut in frame so as to be 2 cm square and 1 cm in width. These sheets were stacked with their edges aligned and laminated at 80 degrees centigrade and under a pressure of $4 \times 10^7$ Pa. This was put into an electric furnace with the laminated body sandwiched from up and down with alumina plates. A weight of the alumina plate at the upper portion was approximately 100 g. Then, the electric furnace was heated to 1600 degrees centigrade, and the sandwiched body was sintered there in air for 10 hrs. The obtained integrated sintered body had a thickness of approximately 0.5 mm at the periphery thereof and the flat film body was dense and had a thickness of approximately 100 μm. The bending strength according to the method mentioned in Example 2 was enough to withstand a weight of 1 kg. Furthermore, the air tightness test showed it had the permeability of $1 \times 10^{-3}$ mL●mm/atm●min●cm², that is, sufficient air-tightness.

Figure 9:
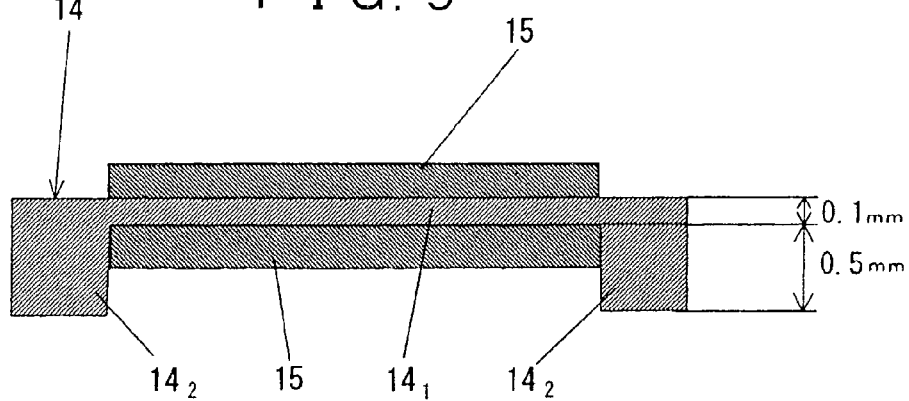
FIG. 9 is a sectional view of a battery cell in the embodiment.

With the integrated electrolyte of the flat film body and the supporting structure, a cell of a fuel cell shown with a sectional view in FIG. 9 was prepared. On both surfaces of the integrated electrolyte 14, a platinum paste as electrodes 15 was coated and baked at 850 degrees centigrade, and thereby a battery was prepared.

Thus, the integrated electrolyte 14 of the flat film body $14_1$ and the supporting structure $14_2$ was found to function also as a structural material.

To the cell, similarly to Example 1, hydrogen and air were fed and the power-generating properties of the cell were investigated. The output was stably extracted, and at room temperature and 300 degrees centigrade, maximum outputs of 0.003 mW/cm² and 0.5 mW/cm², respectively, were obtained. It was confirmed that it could be excellently operated as a fuel cell from room temperature to 300 degrees centigrade.

The preparation of the slurry is not restricted to the example; that is, the binder and the solvent may be other substances, neither the mixing amount nor the Doctor Blade gap is provided. Furthermore, when an integrated electrolyte of the flat film body and the supporting structure is prepared, in the present example, as to the green sheet, one of the plane table sheet and four of the cut-out sheets were used; however, for instance, two of plane table sheets and five cut-out sheets may be laminated, and the method to cut out may conform to cell design. The sintering temperature and the sintering method may have any patterns. The preparation of the electrode is not provided either.

Example 7

The present example shows that a collective cell that is actually assembled with carbon material and stainless steel for a housing and a separator can be stably operated.

Figure 10:
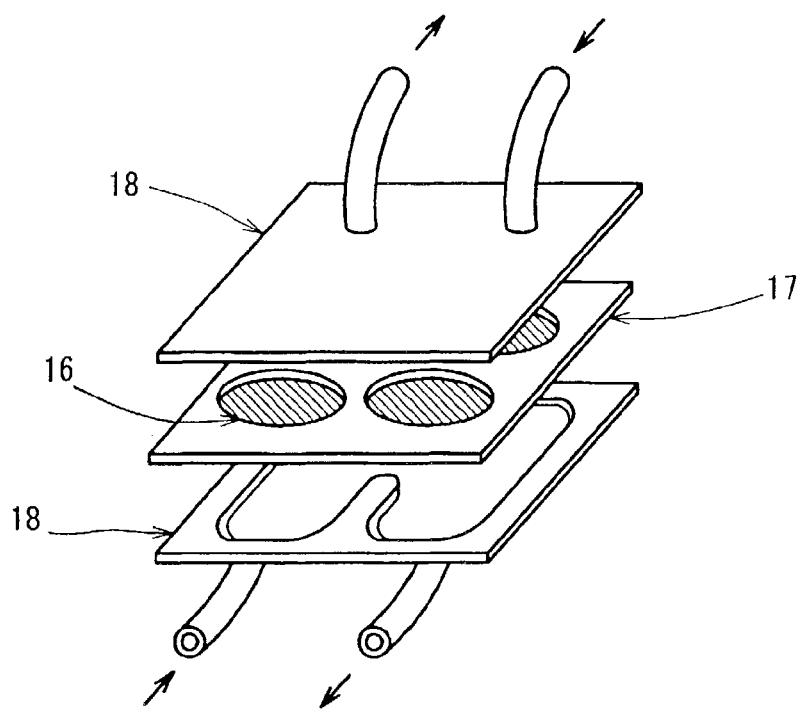
FIG. 10 is an exploded perspective view of a collective cell.

First, an example in which stainless steel was used for the housing and the separator will be shown. In FIG. 10, a configuration of a fuel cell prepared according to the example is shown. As a solid electrolyte 16, $BaZr_{0.4}Ce_{0.4}In_{0.2}Al_{0.02}O_{3-\alpha}$ having a diameter of 13 mm and a thickness of 220 μm was used, and, in the same drawing, an anode on a top surface side and a cathode on a bottom surface side were formed with platinum material. This was adhered to a ceramic substrate 17 to hold.

The adhesion was carried out as follows. That is, in recess portions of the substrate 17 that has four openings having a diameter of 9 mm and in which circular recesses having a diameter of 13.5 mm with a center at the center of the opening are formed for accommodating solid electrolytes 16, the solid electrolytes 16 provided with the anode and the cathode were accommodated and periphery portions thereof were adhered to the substrate. The anode and the cathode were formed so as to face from the openings.

Furthermore, the cell was constituted with stainless steel current collectors embracing a separator 18 superposed from above and below. In the example, the current collector embracing the separator 18 combined with the housing.

As the stainless steel, SUS 304 that contains 18 percent of Cr, 8 percent of Ni, 71 percent of Fe and other elements of 3 percent was used. Furthermore, the thermal expansion coefficient thereof was $11 \times 10^{-6}/K$, and the thermal expansion coefficients of the electrolyte and the ceramic substrate, respectively, were $10.5 \times 10^{-6}/K$ and $11 \times 10^{-6}/K$ that are close to that of the stainless steel. A total electrode area of the fuel cell was 2 cm².

With the cell heated at 200 degrees centigrade, to the anode and the cathode, as shown respectively with arrow marks, hydrogen and air were flowed, respectively, at a flow rate of 50 cc/min, and thereby the power generating test was carried out. The collective cell could be excellently operated and results were shown in FIG. 11. The power generating properties of the collective cell were the same with a total of that of single cells, namely, it was found to operate as a collective cell. Furthermore, the machining of the SUS 304 was easy in comparison with that of the oxide and less expensive. Furthermore, it is also superior in the durability.

In the present example, the electrolyte was made of $BaZr_{0.4}Ce_{0.4}In_{0.2}Al_{0.02}O_{3-\alpha}$ and the electrode was made of platinum; however, other protonic oxide conductors may be used and the electrode may not be platinum. Furthermore, in the example, SUS 304 stainless steel was used for the current collector that combines with the separator; however, the stainless steel may be SUS 430 or a metal with iron as main component containing 18 percent or less Cr, or a carbon material or a resin material may be used. When the current collector is formed of a resin material, wiring for the current collector can be previously disposed. Furthermore, as a substrate for holding the electrolyte, the ceramic one was used in the example; however, design and material thereof may be any one.

The stainless steel is preferably one that is mainly made of iron and contains 20 percent or less of Cr element, and the thermal expansion coefficient thereof is preferably $9-15 \times 10^{-6}/K$.

Example 8

In the present example, an example in which a carbon material is used for a separator will be shown.

Figure 12:
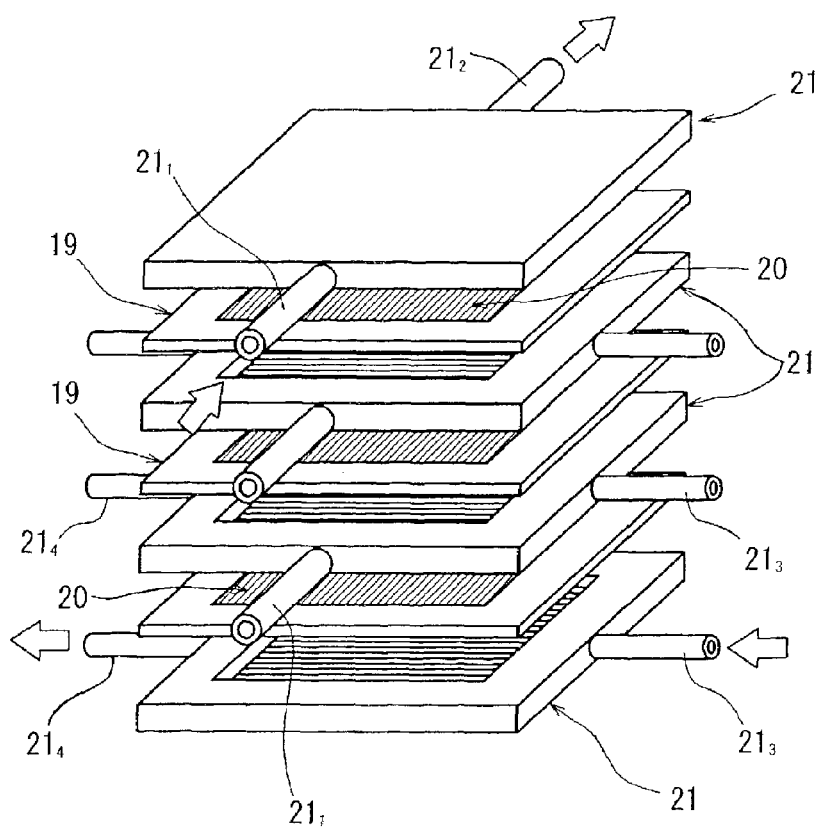
FIG. 12 is an exploded perspective view of another collective cell.

In FIG. 12, a configuration of a three-cell stack fuel cell manufactured according to the example is shown. For a solid electrolyte 19, a 20 mm square and 280 μm thick $BaZr_{0.6}Ce_{0.2}Gd_{0.2}Al_{0.02}O_{3-\alpha}$ plate was used, and for an anode 20 and a cathode on a back surface side, platinum material was used. Separators 21 made of a carbon material were disposed above and below the cell to form a collective cell. As the carbon material, isotropic graphite G347 manufactured by Tokai Carbon Co., Ltd was used. The thermal expansion coefficient and resistance thereof, respectively, were $4.2 \times 10^{-6}/K$ and 11 μΩm. A total electrode area of the fuel cell was 6.75 cm². With the cell heated at 200 degrees centigrade, to the anode 20 and the cathode, respectively, hydrogen and air were flowed at a flow rate of 50 cc/min, and thereby the power-generating test was carried out. Reference numerals $21_1$ and $21_2$, respectively, denote an inlet and an outlet of hydrogen, and reference numerals $21_3$ and $21_4$, respectively, denote an inlet of air and an outlet of an exhaust gas.

Figure 13:
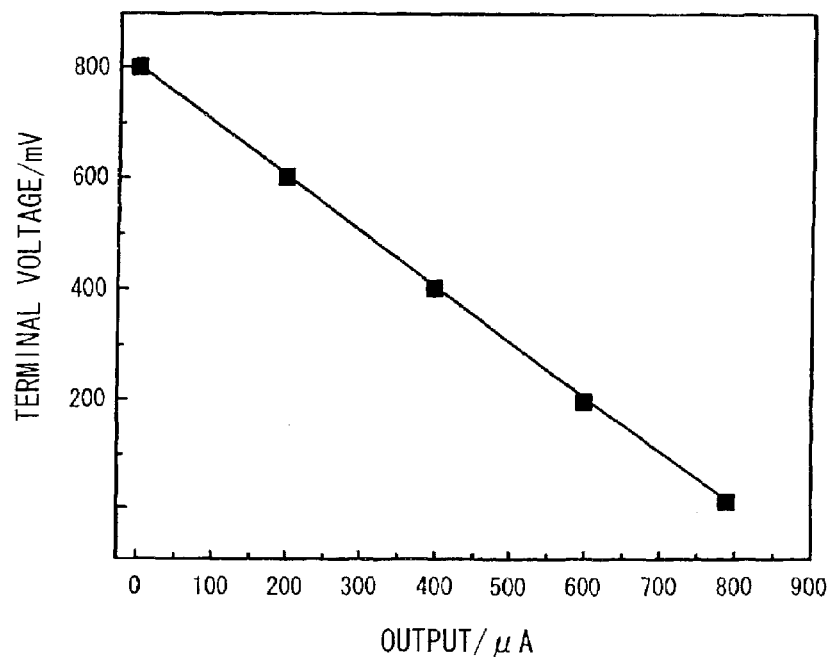
FIG. 13 is a diagram showing power generation characteristics of FIG. 12.

The collective cell excellently generated power, and results are shown in FIG. 13. The power-generating characteristics of the collective cell were the same as a total of that of single cells, that is, it was found to operate as a collective cell. Furthermore, the carbon can be more easily machined in comparison with the oxide and is less expensive. Furthermore, the carbon material is superior in the durability.

In the example, 20 mm square and 280 μm thick $BaZr_{0.6}Ce_{0.2}Gd_{0.2}Al_{0.02}O_{3-\alpha}$ was used for the electrolyte and platinum was used for the electrode; however, other proton conductive oxides may be used, the electrode may not be platinum, and shape and size may not be as those provided. Furthermore, in the example, for the separator, isotropic graphite G347 manufactured by Tokai Carbon Co., Ltd. was used; however, the carbon material may be G348 or SiC coated one; that is, any carbon material that is mainly made of graphite may be used. Furthermore, in place of the carbon material, metal, such as stainless steel or a resin material may be used. Neither the shape nor the size is stipulated.

Figure 11:
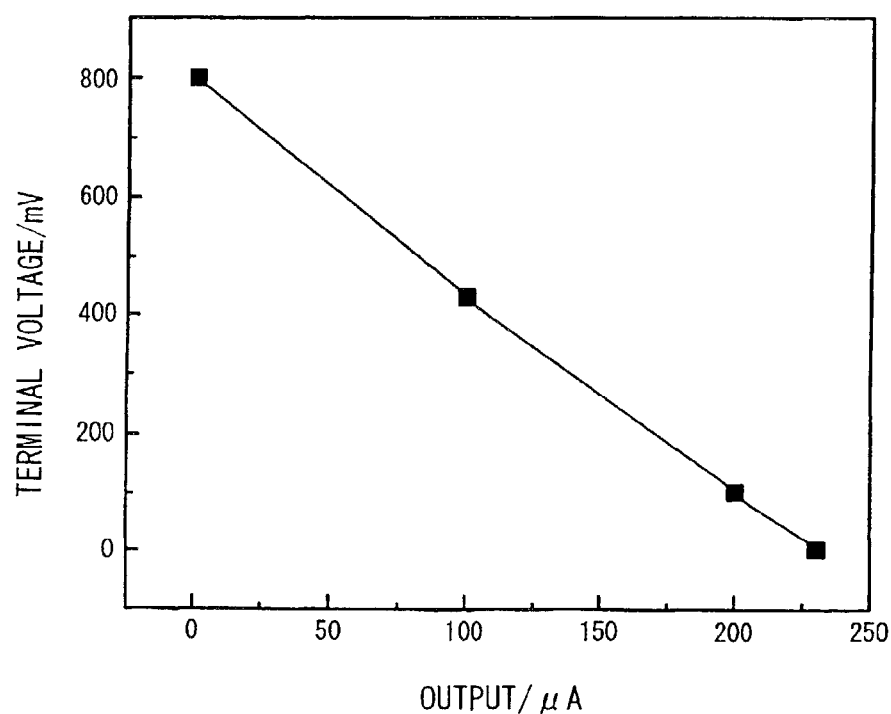
FIG. 11 is a diagram showing power generation characteristics of FIG. 10.
Figure 14:
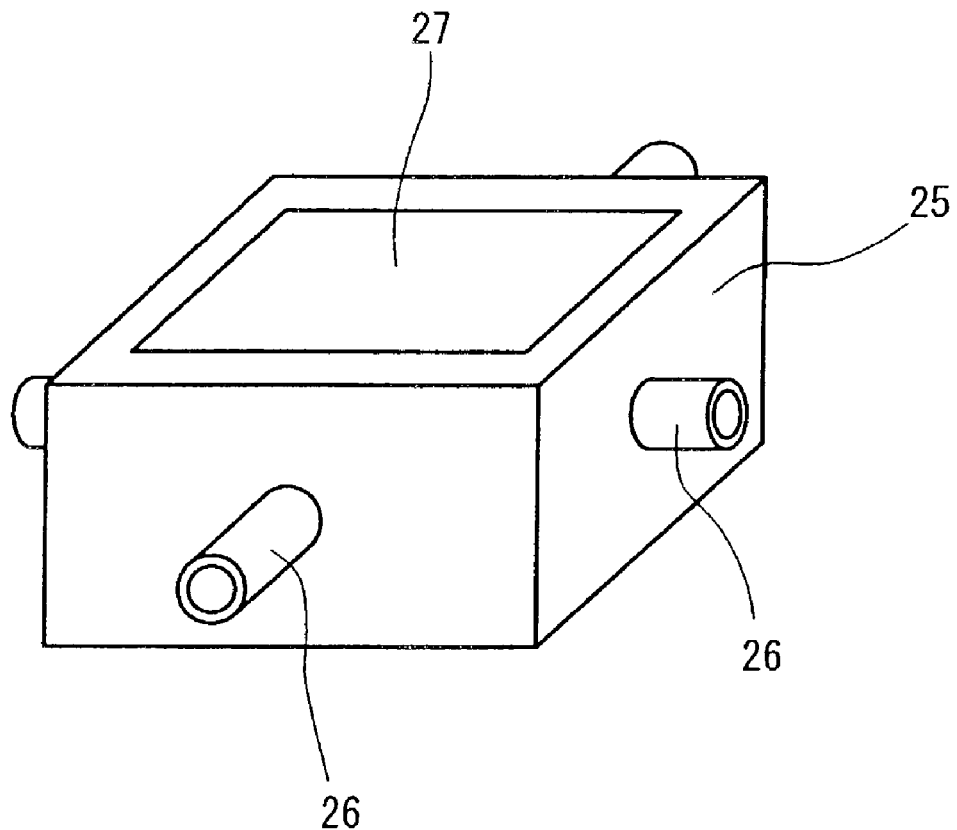
FIG. 14 is a schematic constitutional view of a collective cell including a housing.

In FIG. 14, a schematic diagram of a housing that accommodates the collective cell of FIG. 11 is shown. In the same drawing, reference numeral 25 denotes a housing body made of a resin material, reference numeral 26 denotes a gas feed portion made of metal, and reference numeral 27 denotes a current collector (current collector housing) made of metal.

OTHER EXAMPLES

The higher the ionic conductivity (S/cm) of an electrolyte film and the thinner a film thickness (cm) the higher the output of a fuel cell. As a numeral value considering this, there is sheet resistivity ($\Omega cm^2$). The smaller the sheet resistivity is, the larger becomes the cell output. The sheet resistivity is given according to the following equation.

Sheet resistivity ($\Omega cm^2$)={1/ionic conductivity (S/cm)}× film thickness (cm)=specific resistance ($\Omega cm$)×film thickness (cm)

In the present example, a lower limit of the cell power generation was set at 0.001 mW/cm$^2$; with respect to the sheet resistivity at this time (approximately 10000 $\Omega cm^2$), the electrolyte films were evaluated according to three grades of excellent material ⊚, applicable material ◯ and material difficult to apply X. Results are shown in Table 3. In Table 3, minimum sheet resistivities at room temperature are shown.

TABLE 3

| Electrolyte Material | Minimum Sheet Resistivity ($\Omega\ cm^2$) <specific resistance × film thickness> | Evaluation |
|---|---|---|
| $BaZr_{0.6}Ce_{0.2}Gd_{0.2}O_{3-\alpha}$ | 1000 | ⊚ |
| $BaZr_{0.4}Ce_{0.4}Gd_{0.1}In_{0.1}O_{3-\alpha}$ | 920 | ⊚ |
| $BaZr_{0.4}Ce_{0.4}Nd_{0.2}O_{3-\alpha}$ | 2050 | ◯ |
| $BaCe_{0.8}Sm_{0.2}O_{3-\alpha}$ | 1220 | ◯ |
| $BaCe_{0.8}Dy_{0.2}O_{3-\alpha}$ | 2340 | ◯ |
| $BaCe_{0.8}Eu_{0.2}Al_{0.02}O_{3-\alpha}$ | 1655 | ◯ |
| $BaCe_{0.8}Pr_{0.2}O_{3-\alpha}$ | 4550 | ◯ |
| $BaCe_{0.8}Pm_{0.2}O_{3-\alpha}$ | 3310 | ◯ |
| $BaCe_{0.8}La_{0.2}O_{3-\alpha}$ | 8620 | ◯ |
| $BaCe_{0.8}Tb_{0.2}O_{3-\alpha}$ | 4680 | ◯ |
| $BaCe_{0.8}Ho_{0.2}O_{3-\alpha}$ | 6770 | ◯ |
| $BaCe_{0.8}Er_{0.2}O_{3-\alpha}$ | 7930 | ◯ |
| $BaCe_{0.8}Tm_{0.2}O_{3-\alpha}$ | 9620 | ◯ |
| $BaCe_{0.8}Lu_{0.2}O_{3-\alpha}$ | 8440 | ◯ |
| $BaCe_{0.8}Sc_{0.2}O_{3-\alpha}$ | 2660 | ◯ |
| $BaZr_{0.4}Ce_{0.4}Gd_{0.1}In_{0.2}Al_{0.02}O_{3-\alpha}$ | 3260 | ◯ |
| $BaZr_{0.6}Ce_{0.2}Gd_{0.1}Y_{0.1}Al_{0.02}O_{3-\alpha}$ | 1580 | ◯ |
| $BaZr_{0.4}Ce_{0.2}Gd_{0.4}O_{3-\alpha}$ | 12000 | X |
| $BaZr_{0.6}Ce_{0.1}In_{0.3}O_{3-\alpha}$ | 10050 | X |
| $BaZr_{0.3}Ce_{0.5}In_{0.2}Al_{0.05}O_{3-\alpha}$ | 10100 | X |
| YSZ | >50000 | X |

⊚: excellent material, ◯: applicable material, and X: material difficult to apply.

Electrolyte materials according to the invention were evaluated as excellent materials ⊚, or applicable materials ◯.

While there have been described what are at present considered to be preferred embodiments of this invention, it will be understood that various modifications may be made therein, and it is intended to cover in the appended claims all such modifications as fall within the true spirit and scope of this invention.

What is claimed is:

1. A solid electrolyte fuel cell including:
a pair of electrodes; and
a solid electrolyte disposed between the electrodes;
wherein the solid electrolyte is a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0, 0.3>y>0, 0.04>z>0$, and $1.5 >\alpha>0$).

2. A solid electrolyte fuel cell including:
a pair of electrodes; and
a solid electrolyte disposed between the electrodes;
wherein the solid electrolyte is a protonic oxide conductor having a composition represented by $BaZr_{1-y}M_yAl_zO_{3-\alpha}$ (M: one or more kinds of elements selected from a group of tri-valent rare earth elements and In, $0.3>y>0, 0.04>z>0$, and $1.5>\alpha x>0$).

3. A solid electrolyte fuel cell including:
a pair of electrodes; and
a solid electrolyte disposed between the electrodes;
wherein the solid electrolyte is a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0, 0.3>y>0, 0.04>z>0$, and $1.5>\alpha>0$); and
a supporting structure that supports the solid electrolyte is made of a resin material.

4. A solid electrolyte fuel cell as set forth in claim 3:
wherein the M in a composition of the protonic oxide conductor is one or more kinds of elements selected from a group of In, Gd, Y and Yb.

5. A solid electrolyte fuel cell as set forth in claim 3:
wherein the electrode is made of platinum supported on carbon.

6. A solid electrolyte fuel cell as set forth in claim 3:
wherein the electrode is made of a mixture of particulate platinum and a material having the same components as those of the protonic oxide conductor.

7. A solid electrolyte fuel cell including:
a pair of electrodes; and
a solid electrolyte disposed between the electrodes;
wherein the solid electrolyte is a protonic oxide conductor having a composition represented by $BaCe_{1-y}M_yAl_zO_3-\alpha$ (M: one or more kinds of elements selected from a group of tri-valent rare earth elements and In, $0.3>y>0, 0.04>z>0$, and $1.5>\alpha>0$); and
a supporting structure that supports the solid electrolyte is made of a resin material.

8. A solid electrolyte fuel cell as set forth in claim 7:
wherein the M in a composition of the protonic oxide conductor is one or more kinds of elements selected from a group of In, Gd, Y and Yb.

9. A solid electrolyte fuel cell as set forth in claim 7:
wherein the electrode is made of platinum supported on carbon.

10. A solid electrolyte fuel cell as set forth in claim 7:
wherein the electrode is made of a mixture of particulate platinum and a material having the same components as those of the protonic oxide conductor.

11. A solid electrolyte fuel cell including:
a pair of electrodes; and
a solid electrolyte disposed between the electrodes;
wherein the solid electrolyte is a protonic oxide conductor having a composition represented by $BaZr_{1-y}M_yAl_zO_{3-\alpha}$ (M: one or more kinds of elements selected from a group of tri-valent rare earth elements and In, $0.3>y>0, 0.04>z>0$, and $1.5>\alpha>0$); and
a supporting structure that supports the solid electrolyte is made of a resin material.

12. A solid electrolyte fuel cell as set forth in claim 11:
wherein the M in a composition of the protonic oxide conductor is one or more kinds of elements selected from a group of In, Gd, Y and Yb.

13. A solid electrolyte fuel cell as set forth in claim 11:
wherein the electrode is made of platinum supported on carbon.

14. A solid electrolyte fuel cell as set forth in claim 11:
wherein the electrode is made of a mixture of particulate platinum and a material having the same components as those of the protonic oxide conductor.

15. A solid electrolyte fuel cell including:
a pair of electrodes; and
a solid electrolyte disposed between the electrodes;
wherein the solid electrolyte is a protonic oxide conductor and an integrated body of a dense sintered body and a porous sintered body.

16. A solid electrolyte fuel cell as set forth in claim 15:
wherein the solid electrolyte is a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0$, $0.3>y>0$, $0.04>z>0$, and $1.5>\alpha>0$).

17. A solid electrolyte fuel cell as set forth in claim 15:
wherein the solid electrolyte is a protonic oxide conductor having a composition represented by $BaCe_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$).

18. A solid electrolyte fuel cell as set forth in claim 15:
wherein the solid electrolyte is a protonic oxide conductor having a composition represented by $BaZr_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$).

19. A solid electrolyte fuel cell as set forth in claim 15:
wherein the solid electrolyte is a protonic oxide conductor having a composition represented by $Ba(Zr_{1-x}Ce_x)_{1-y}M_yO_{3-\alpha}$ (M: one or more kinds of elements selected from a group of tri-valent rare earth elements and In, $1>x>0$, $0.3>y>0$, and $1.5>\alpha>0$).

20. A solid electrolyte fuel cell as set forth in claim 15:
wherein the solid electrolyte is a protonic oxide conductor having a composition represented by $BaCe_{1-y}M_yO_{3-\alpha}$ (M: one or more kinds of elements selected from a group of tri-valent rare earth elements and In, $0.3>y>0$, and $1.5>\alpha>0$).

21. A solid electrolyte fuel cell as set forth in claim 15:
wherein the solid electrolyte is a protonic oxide conductor having a composition represented by $BaZr_{1-y}M_yO_{3-\alpha}$ (M: one or more ) kinds of elements selected from a group of tri-valent rare earth elements and In, $0.3>y>0$, and $1.5>\alpha>0$).

22. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $Ba(Zr_{1-x}Ce_x)1-yM_yAl_zO_{3-\alpha}$ (M: one or more kinds of elements selected from a group of tri-valent rare earth elements and In, $1>x>0$, $0.3>y>0$, $0.04>z>0$, and $1.5>\alpha>0$).

23. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $BaCe_{1-y}M_yAl_zO_{3-\alpha}$ (M: one or more kinds of elements selected from a group of tri-valent rare earth elements and In, 0, $0.3>y>0$, $0.04>z>0$, and $1.5>\alpha>0$).

24. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $Ba(Zr_{1-y}M_yAl_zO_{3-\alpha}$ (M: one or more kinds of elements selected from a group of tri-valent rare earth elements and In, 0, $0.3>y>0$, $0.04>z>0$, and $1.5>\alpha>0$).

25. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $Ba(Zr_{1-x}Ce_x)_{1-y}M_yO_{3-\alpha}$ (M: one or more kinds of elements selected from a group of tri-valent rare earth elements and In, $1>x>0$, $0.3>y>0$, and $1.5>\alpha>0$).

26. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $BaCe_{1-y}M_yO_{3-\alpha}$ (M: one or more kinds of elements selected from a group of tri-valent rare earth elements and In, $0.3>y>0$, and $1.5>\alpha>0$).

27. A solid electrolyte fuel cell including:
a pair of electrodes; and
a solid electrolyte disposed between the electrodes;
wherein the solid electrolyte is a protonic oxide conductor; one of the pair of electrodes is an electrode mainly made of platinum; and the other one is a porous electrode made of a porous body carrying platinum;
the solid electrolyte having a composition represented by $BaZr_{1-y}M_yO_{3-\alpha}$ (M: one or more kinds of elements selected from a group of tri-valent rare earth elements and In, $0.3>y>0$, and $1.5>\alpha>0$).

28. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;
wherein a film body and a supporting structure that supports the film body are integrated into one body so as to comprise the solid electrolyte;
the solid electrolyte having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0$, $0.3>y>0$, $0.04>z>0$, and $1.5>\alpha>0$).

29. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;

wherein a film body and a supporting structure that supports the film body are integrated into one body so as to comprise the solid electrolyte;

the solid electrolyte having a composition represented by $BaCe_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$).

30. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;
wherein a film body and a supporting structure that supports the film body are integrated into one body so as to comprise the solid electrolyte;
the solid electrolyte having a composition represented by $BaZr_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$).

31. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;
wherein a film body and a supporting structure that supports the film body are integrated into one body so as to comprise the solid electrolyte;
the solid electrolyte having a composition represented by $Ba(Zr_{1-x}Ce_x)_{1-y}M_yO_{3-\alpha}$ (M: one or more kinds of elements selected from a group of tri-valent rare earth elements and In, $1>x>0$, $0.3>y>0$, and $1.5>\alpha>0$).

32. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;
wherein a film body and a supporting structure that supports the film body are integrated into one body so as to comprise the solid electrolyte;
the solid electrolyte having a composition represented by $BaCe_{1-y}M_yO_{3\alpha}$ (M: one or more kinds of elements selected from a group of tri-valent rare earth elements and In, $0.3>y>0$, and $1.5>\alpha>0$).

33. A solid electrolyte fuel cell including:
a pair of electrodes; and
a solid electrolyte disposed between the electrodes;
wherein the electrodes are electrodes mainly made of platinum; and the solid electrolyte is a protonic oxide conductor;
wherein a film body and a supporting structure that supports the film body are integrated into one body so as to comprise the solid electrolyte;
the solid electrolyte having a composition represented by $BaZr_{1-y}M_yO_{3-\alpha}$ (M: one or more kinds of elements selected from a group of tri-valent rare earth elements and In, $0.3>y>0$, and $1.5>\alpha>0$).

34. A solid electrolyte fuel cell including:
a cell including a pair of electrodes; a solid electrolyte disposed between the electrodes; and separators disposed on both sides of the electrodes; and
a housing surrounding the cell together with a current collector;
wherein the solid electrolyte is a protonic oxide conductor having a composition represented by $Ba(Zr_{1-x}Ce_x)_{1-y}M_yAl_zO_{3-\alpha}$ (M: one or more kinds of elements selected from a group of tri-valent rare earth elements and In, $1>x>0$, $0.3>y>0$, $0.04>z>0$, and $1.5>\alpha>0$); and
at least any one of the separator, the current collector and the housing is formed of at least any one of resin, carbon and metal.

35. A solid electrolyte fuel cell as set forth in claim 34:
wherein the metal is stainless steel that is mainly made of iron and contains 20 percent or less of chromium.

36. A solid electrolyte fuel cell as set forth in claim 34:
wherein the metal is stainless steel whose thermal expansion coefficient is in the range of from $9\times10^{-6}$ to $15\times10^{-6}$/K.

37. A solid electrolyte fuel cell including:
a cell including a pair of electrodes; a solid electrolyte disposed between the electrodes; and separators disposed on both sides of the electrodes; and
a housing surrounding the cell together with a current collector;
wherein the solid electrolyte is a protonic oxide conductor having a composition represented by $BaCe_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$); and
at least any one of the separator, the current collector 5 and the housing is formed of at least any one of resin, carbon and metal.

38. A solid electrolyte fuel cell as set forth in claim 37:
wherein the metal is stainless steel that is mainly made of iron and contains 20 percent or less of chromium.

39. A solid electrolyte fuel cell as set forth in claim 37:
wherein the metal is stainless steel whose thermal expansion coefficient is in the range of from $9\times10^{-6}$ to $15\times10^{-6}$/K.

40. A solid electrolyte fuel cell including:
a cell including a pair of electrodes; a solid electrolyte disposed between the electrodes; and separators disposed on both sides of the electrodes; and
a housing surrounding the cell together with a current collector;
wherein the solid electrolyte is a protonic oxide conductor having a composition represented by $BaZr_{1-y}M_yAl_zO_{3-\alpha}$ (M: one or more kinds of elements selected from a group of tri-valent rare earth elements and In, $0.3>y>0$, $0.04>z>0$, and $1.5>\alpha>0$); and
at least any one of the separator, the current collector and the housing is formed of at least any one of resin, carbon and metal.

41. A solid electrolyte fuel cell as set forth in claim 40:
wherein the metal is stainless steel that is mainly made of iron and contains 20 percent or less of chromium.

42. A solid electrolyte fuel cell as set forth in claim 40:
wherein the metal is stainless steel whose thermal expansion coefficient is in the range of from $9\times10^{-6}$ to $15\times10^{-6}$/K.

43. A method of manufacturing a solid electrolyte fuel cell that includes a pair of electrodes; and a solid electrolyte disposed between the electrodes; wherein the electrode is mainly made of platinum; the solid electrolyte is a protonic oxide conductor; and a film body and a supporting structure that supports the film body are integrated in one body, including:
superposing at least two or more sheets of electrolyte slurry and co-sintering, and thereby forming an integrated body.

44. A method of manufacturing a solid electrolyte fuel cell that includes a pair of electrodes; and a solid electrolyte disposed between the electrodes; wherein the solid electrolyte is a protonic oxide conductor and an integrated body of a dense sintered body and a porous sintered body, including:

preparing sheets of electrolyte slurry for use in dense sintered body and porous sintered body that are different in amount of an organic binder; and superposing at least two or more of the sheets and co-sintering and thereby forming an integrated body of a dense sintered body and a porous sintered body.

* * * * *

UNITED STATES PATENT AND TRADEMARK OFFICE
CERTIFICATE OF CORRECTION

| | | |
|---|---|---|
| PATENT NO. | : 7,141,327 B2 | Page 1 of 1 |
| APPLICATION NO. | : 10/453535 | |
| DATED | : November 28, 2006 | |
| INVENTOR(S) | : Noboru Taniguchi | |

It is certified that error appears in the above-identified patent and that said Letters Patent is hereby corrected as shown below:

Column 18, line 2, change "In, 0, 0.3>y>0," to -- In, 0.3>y>0, --

Column 18, line 11, change "$Ba(Zr_{1-y}M_yAl_zO_{3-\alpha}$" to -- $BaZr_{1-y}M_yAl_zO_{3-\alpha}$ --

Column 18, line 13, change "In, 0, 0.3>y>0," to -- In, 0.3>y>0 --

Signed and Sealed this

Twenty-second Day of May, 2007

JON W. DUDAS
*Director of the United States Patent and Trademark Office*